(12) United States Patent
Lim et al.

(10) Patent No.: US 10,192,077 B2
(45) Date of Patent: Jan. 29, 2019

(54) COMBINED READING APPARATUS FOR IDENTIFYING PRODUCT

(71) Applicant: HANMI IT CO., LTD., Seoul (KR)

(72) Inventors: Jong Hoon Lim, Seoul (KR); Sung Ki Lim, Namyangju-si (KR)

(73) Assignee: HANMI IT CO., LTD., Seoul (KR)

( * ) Notice: Subject to any disclaimer, the term of this patent is extended or adjusted under 35 U.S.C. 154(b) by 0 days.

(21) Appl. No.: 15/623,551

(22) Filed: Jun. 15, 2017

(65) Prior Publication Data

US 2017/0364714 A1 Dec. 21, 2017

(30) Foreign Application Priority Data

Jun. 17, 2016 (KR) .................. 10-2016-0075616

(51) Int. Cl.
*G06K 7/00* (2006.01)
*G06K 7/10* (2006.01)

(52) U.S. Cl.
CPC ....... *G06K 7/0004* (2013.01); *G06K 7/10009* (2013.01); *G06K 7/10386* (2013.01); *G06K 7/10881* (2013.01); *G06K 2007/10524* (2013.01)

(58) Field of Classification Search
CPC ............ G06Q 10/087; G06Q 30/0635; G06Q 30/0639; G06Q 10/0875; G01C 15/00; G06K 19/0722; G06K 19/07758; G06K 7/0004; G06K 7/10316; G06K 7/10346; G06K 7/10366
USPC ........................................... 235/440
See application file for complete search history.

(56) References Cited

U.S. PATENT DOCUMENTS

| | | | |
|---|---|---|---|
| 9,171,281 B1* | 10/2015 | Francis | .............. G06Q 10/0875 |
| 2007/0174152 A1* | 7/2007 | Bjornberg | .............. G01C 15/00 |
| | | | 705/28 |
| 2009/0039162 A1 | 2/2009 | Yen | |
| 2009/0289116 A1* | 11/2009 | Copeland | ............ G06K 7/0004 |
| | | | 235/440 |

(Continued)

FOREIGN PATENT DOCUMENTS

| | | |
|---|---|---|
| EP | 1398725 A2 | 3/2004 |
| JP | 2004-102947 A | 4/2004 |

(Continued)

*Primary Examiner* — Thien M Le
(74) *Attorney, Agent, or Firm* — KORUS Patent, LLC; Seong Il Jeong

(57) ABSTRACT

Disclosed herein is a combined reading apparatus for identifying a product. According to a first aspect of the present invention, a combined reading apparatus may include: a plate panel configured to recognize Radio Frequency Identification (RFID) tag information, configured such that an antenna adapted to transmit and receive a Radio Frequency (RF) signal to and from an RFID tag is included therein, and formed in a plate shape having predetermined lengths in a horizontal direction and a height direction; a connection bar coupled to one side of the plate panel, configured to support the plate panel, and configured to extend from the plate panel in the horizontal direction; a grip formed in a bar shape so as to be held by a hand, spaced apart from the plate panel, and coupled to the connection bar; and a control unit configured to control the RF transmission and reception of the antenna.

11 Claims, 5 Drawing Sheets

(56) References Cited

U.S. PATENT DOCUMENTS

2012/0299703 A1* 11/2012 Chen .................. G06K 19/0722
                                                    340/10.1
2013/0329380 A1* 12/2013 Tran .................... G01R 31/002
                                                    361/748
2017/0228688 A1*  8/2017 Bourlon ............... G06Q 10/087

FOREIGN PATENT DOCUMENTS

| JP | 2011-108131       | 6/2011  |
| KR | 10-2012-0001164 A | 1/2012  |
| KR | 20-0463901 Y1     | 11/2012 |
| KR | 10-2013-0010827 A | 1/2013  |
| KR | 10-2015-0087049 A | 7/2015  |
| WO | 2015/111910 A1    | 7/2015  |

* cited by examiner

COMBINED READING APPARATUS FOR IDENTIFYING PRODUCT

BACKGROUND

1. Technical Field

The present invention relates to a combined reading apparatus for identifying a product, and more particularly to a combined reading apparatus which identifies a product by reading a Radio Frequency Identification (RFID) tag or image code attached to the product.

2. Description of the Related Art

Recently, in keeping with their commercialization, RFID tags have been used for various purposes, such as product management, etc.

RFID tags can provide higher recognition rates and can store larger amounts of data than image codes, such as bar codes, QR codes, or the like, which are used for conventional methods of identifying a product, and thus have been replacing image codes.

Although RFID tags have been increasingly used, image codes have been still used due to costs and existing facilities.

Accordingly, to manage products using different identification methods, a problem arises in that both an RFID reader and an image code reader are required because the RFID reader and the image code reader must be selectively used depending on an identification method used by each of the products.

In connection with this, Korean Patent Application Publication No. 10-2010-0023830 discloses a technology which is configured to acquire tag data through the processing of a tag signal received via a communication module disposed inside an RFID reader and configured to communicate with a tag and which is also configured to communicate with an adjacent RFID reader and middleware. However, this technology does not provide a reader capable of reading both an image code and an RFID tag, and thus cannot overcome the above problem.

Accordingly, there is a need for a technology which is capable of overcoming the above problem.

Meanwhile, the above-described related art corresponds to technical information which has been possessed by the present inventor in order to conceive the present invention or which has been acquired in the process of conceiving the present invention, and is not necessarily considered to be a well-known technology that had been known to the public before the filing date of the present invention.

SUMMARY

An object of at least one embodiment of the present invention is to provide a combined reading apparatus configured to include an image code reader in order to recognize an image code in addition to an RFID tag while maintaining the size or weight of an RFID reader.

An object of at least one embodiment of the present invention is to provide a wrist support configured to support a wrist so that a load, applied to the wrist due to a biased weight attributable to the shape of a combined reading apparatus, can be distributed.

An object of at least one embodiment of the present invention is to rotate the direction of a plate panel configured to recognize an RFID tag based on a signal received from the RFID tag, thereby increasing the rate of recognition.

An object of at least one embodiment of the present invention is to extend a plate configured to recognize an RFID tag, thereby increasing the rate of the recognition of an RFID tag.

In order to achieve at least one of the above-described objects, according to a first aspect of the present invention, there may be provided a combined reading apparatus for identifying a product, the combined reading apparatus including: a plate panel configured to recognize RFID tag information, configured such that an antenna adapted to transmit and receive an RF signal to and from an RFID tag is included therein, and famed in a plate shape having predetermined lengths in a horizontal direction, i.e., a direction from the front thereof to the rear thereof, and in a height direction, i.e., a direction from the top thereof to the bottom thereof; a connection bar coupled to one side of the plate panel, configured to support the plate panel, and configured to extend from the plate panel in the horizontal direction of the plate panel by a predetermined length; a grip formed in a bar shape having a predetermined length so as to be held by a hand, spaced apart from the plate panel by a predetermined distance, and coupled to the connection bar; and a control unit configured to control the RF transmission and reception of the antenna.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
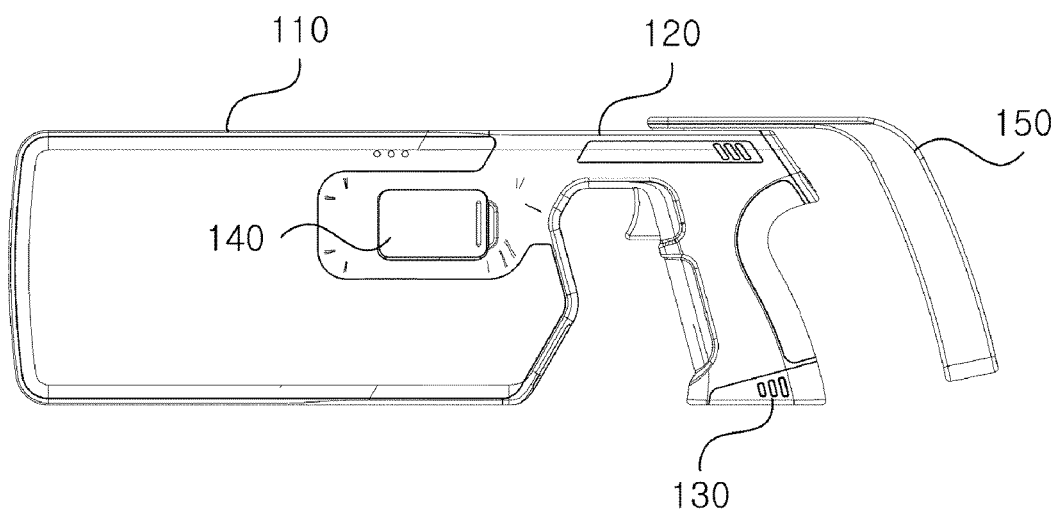
FIG. 1 is a front view showing a combined reading apparatus according to an embodiment of the present invention.

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to descriptions are omitted in order to clearly describe the present invention, and similar reference symbols are assigned to similar components throughout the specification.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The present invention will be described in detail below with reference to the accompanying diagrams.

Prior to the following description of a combined reading apparatus for identifying a product, the terms used herein will be defined first.

The term "image code" refers to a code composed of a pattern indicative of specific information. For example, the image code may include a barcode, a QR code, and the like.

The image code may be optically recognized, and a reader configured to read information corresponding to the image code is referred to as an "image code reader."

FIG. 1 is a perspective view showing a combined reading apparatus 10 according to an embodiment of the present invention, and the combined reading apparatus 10 will be described with reference to FIG. 1.

The combined reading apparatus 10 according to the embodiment of the present invention may include: a plate panel 110 configured to read an RFID tag; a connection bar 120 connected to the plate panel 110, and configured to extend by a predetermined length; a grip 130 configured to be held by a hand of a user; and a control unit (not shown) configured to control the operation of the plate panel 110.

The combined reading apparatus 10 according to the embodiment of the present invention may further include an image code reader 140 disposed in a region of the plate panel 110 and configured to read an image code.

The combined reading apparatus 10 according to the embodiment of the present invention may further include a wrist support 150 coupled to one end of the connection bar 120 which is coupled to the grip 130, configured to extend by a predetermined length in the direction in which the connection bar 120 extends, and curved by a predetermined angle at one location thereof.

First, the plate panel 110 included in the combined reading apparatus 10 according to the embodiment of the present invention may be formed in a finite-plane plate shape having predetermined lengths in a horizontal direction, i.e., a direction from the front thereof to the rear thereof, and in a height direction, i.e., a direction from the top thereof to the bottom thereof.

In the plate panel 110 according to the embodiment of the present invention, an antenna (not shown) configured to recognize a signal through communication with an RFID tag (not shown) may be mounted to form a pattern over a part or all of the plate panel 110, or may be mounted in the form in which the antenna occupies the overall area of the plate panel 110 configured to recognize RFID tag information.

Alternatively, the plate panel 110 according to the embodiment of the present invention may include: an antenna panel (not shown), i.e., a plate in which an antenna is mounted; and a housing configured to cover the outsides of the antenna panel (not shown), and coupled to the antenna panel (not shown) so that the antenna panel (not shown) is selectively inserted and discharged through an insertion hole open forward in the horizontal direction.

In this case, the antenna may include first and second antennas having different radio wave characteristics, and the maximum area in which the antenna is mounted may be determined in proportion to the area of the plate panel 110 or antenna panel (not shown).

Furthermore, the connection bar 120 included in the combined reading apparatus 10 according to the embodiment of the present invention may be coupled to one side of the plate panel 110, may support the plate panel 110, and may be formed in a bar shape extending by a predetermined length in the horizontal direction.

The connection bar 120 may space the plate panel 110 and the grip 130 apart from each other by a predetermined interval, and thus a predetermined space may be formed between the plate panel 110 and the grip 130, thereby enabling a finger of a user holding the grip 130 to be inserted into the predetermined space.

The grip 130 included in the combined reading apparatus 10 according to the embodiment of the present invention may be formed in a bar shape having a predetermined length so as to be held by a hand of a user, may be spaced apart from the plate panel 110 by a predetermined distance, and may be coupled to the connection bar 120.

Furthermore, the image code reader 140 which may be further included in the combined reading apparatus 10 according to the embodiment of the present invention may be disposed in a region of the plate panel 110, may have a width corresponding to that of the plate panel 110, may jointly form the overall shape of the plate panel 110 in the state in which the image code reader 140 has not been rotated, and may be exposed outside the plate panel 110 in the state in which the image code reader 140 has been rotated in any one direction by external force applied to the image code reader 140.

The wrist support 150 may be further included in the combined reading apparatus 10 according to the embodiment of the present invention, may be coupled to one end of the connection bar 120 coupled to the grip 130, may extend by a predetermined length in the direction in which the connection bar 120 extends, and may be curved by a predetermined angle in the direction, in which the grip 130 extends, at one location thereof.

Meanwhile, a communication unit (not shown) configured to communicate with at least any one of a user terminal (not shown) and a server (not shown) over a network N may be further included in the combined reading apparatus 10 according to the embodiment of the present invention.

The communication unit (not shown) may enable the user terminal (not shown) and the combined reading apparatus 10 to be paired with each other, and may receive setting information so that it can be controlled by the user terminal (not shown).

Furthermore, the communication unit (not shown) may transmit tag information, read via the combined reading apparatus 10, to the user terminal (not shown) or server (not shown), or may receive specific tag information.

In this case, the network N may be implemented as one or more of all types of wired/wireless networks, such as a Local Area Network (LAN), a Wide Area Network (WAN), a Value Added Network (VAN), a Personal Area Network (PAN), a mobile radio communication network, the Wireless Broadband (Wibro) Internet, a Mobile Worldwide Interoperability for Microwave Access (mobile WiMAX) network, a High Speed Downlink Packet Access (HSDPA) network, and a satellite communication network.

The user terminal (not shown) may be connected to a remote server over the network N, or may be implemented as a computer, a portable terminal, a television, a wearable device, or the like which can access another terminal or a server. In this case, the computer includes, for example, a notebook, a desktop, or a laptop on which a web browser has been installed. The portable terminal is, for example, a wireless communication device ensuring portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, and a Mobile Worldwide Interoperability for Microwave Access (mobile WiMAX) terminal. Furthermore, the television may include an Internet Protocol Television (IPTV), an Internet Television (Internet TV), a terrestrial TV, a cable TV, etc. Furthermore, the wearable device is, for example, an information processing device of a type which can be directly worn on a human body, such as a watch, glasses, an accessory, a dress, shoes, or the like, and may access a remote server or connect with another terminal over a network directly or by way of another information processing device.

Figure 2:
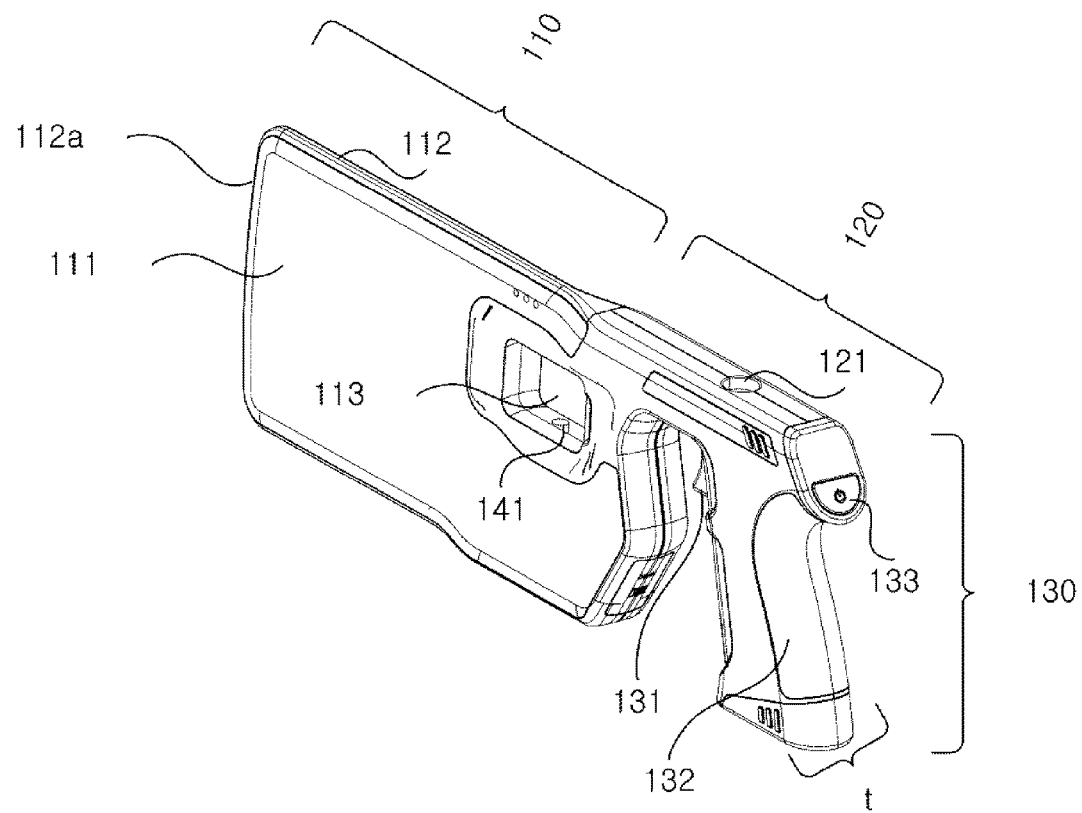
FIGS. 2 and 3 are views showing the examples of the individual components of a combined reading apparatus according to an embodiment of the present invention.
Figure 3:
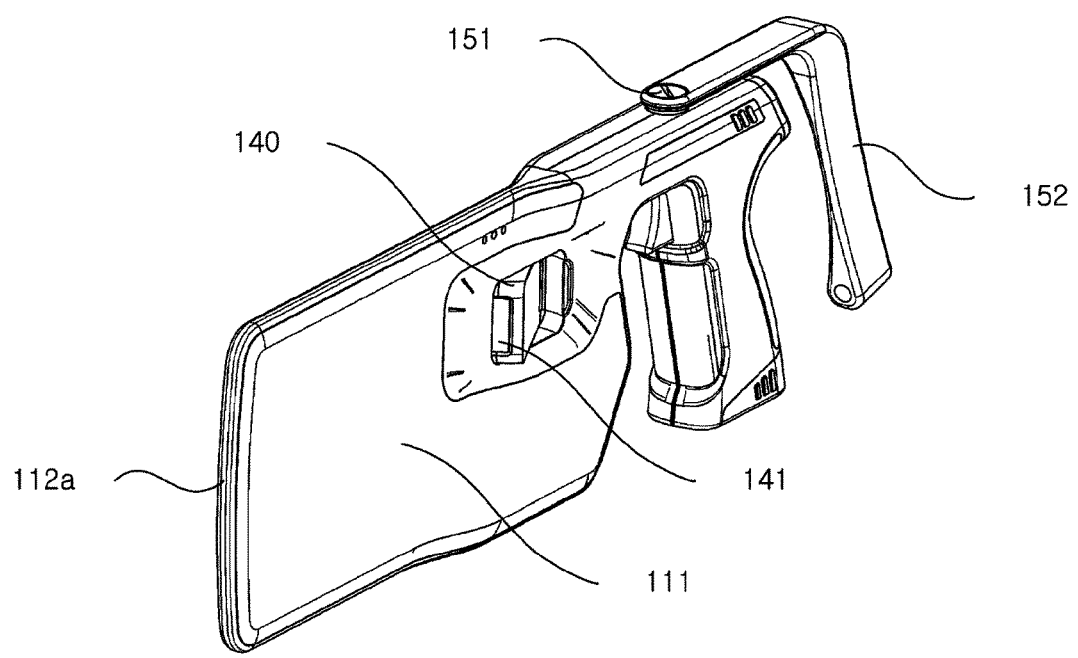

The individual components of a combined reading apparatus 10 according to an embodiment of the present invention will be described in greater detail below with reference to FIGS. 2 and 3.

First, the plate panel 110 of the combined reading apparatus 10 according to the embodiment of the present invention may be formed in a plate shape having a predetermined length in a horizontal direction, i.e., a direction from the front thereof to the rear thereof, a predetermined length in a height direction, i.e., a direction from the top thereof to the bottom thereof, and a predetermined thickness in a width direction, i.e., a direction from the left side thereof to the right side thereof.

The plate panel 110 may include planar recognition surfaces 111 and thickness surfaces 112 extending in the width direction, and each of the recognition surfaces 111 and the thickness surfaces 112 may be made of material capable of transmitting a Radio Frequency (RF) signal, emitted by the antenna (not shown) mounted inside the plate panel 110, therethrough. Accordingly, the RF signal may be emitted through at least one of the recognition surfaces 111 and the thickness surfaces 112 depending on the type of the antenna (not shown) mounted inside the plate panel 110.

In one embodiment, a mounting part 113 configured to have a predetermined size and to penetrate a region of the plate panel 110 may be formed in the plate panel 110. An image code reader 140 which will be described later may be disposed in the formed mounting part 113, and may be coupled to the plate panel 110.

Furthermore, in one embodiment, one side of the plate panel 110 may be coupled to a connection bar 120 so that the plate panel 110 is rotated around the direction in which the connection bar 120 extends.

Accordingly, the plate panel 110 may be rotated around the horizontal direction.

According to another embodiment of the present invention, a plate panel 110 may include: an antenna panel (not shown), i.e., a plate in which an antenna configured to transmit and receive RF signals to and from an RFID tag is mounted; and a housing (not shown) configured to cover the outsides of the antenna panel (not shown), and coupled to the antenna panel (not shown) so that the antenna panel (not shown) is selectively inserted and discharged through an open insertion hole (not shown) formed in a thickness surface 112a on the front side of the housing (not shown) in the horizontal direction.

In this case, the antenna panel (not shown) disposed inside the housing (not shown) of the plate panel 110 may be selectively discharged in front of the housing (not shown), thereby extending the length of the plate panel 110.

For example, the antenna panel (not shown) may be selectively inserted into the plate panel 110 and exposed in front of the plate panel 110 through the insertion hole (not shown) formed in the thickness surface 112a which is located on the front side of the housing (not shown) and belongs to the thickness surfaces 112 of the housing (not shown).

Meanwhile, the connection bar 120 of the combined reading apparatus 10 according to the embodiment of the present invention may be coupled to one side of the plate panel 110, and may extend in the horizontal direction by a predetermined length. A support coupling part 121 may be included in the connection bar 120 at one location so that a wrist support 150 may be selectively attached and detached.

For example, the support coupling part 121 may be provided at the location at which the central axis of a grip 130 coupled to the connection bar 120 intersects the connection bar 120, or may be provided at one end of the connection bar 120.

Furthermore, the support coupling part 121 may be coupled to the wrist support 150 so that the wrist support 150 can be rotated around the height direction, and may apply restoring force to the wrist support 150 so that the wrist support 150 can be aligned in the direction in which the connection bar 120 extends.

For this purpose, an elastic member (not shown), e.g., an elastic object, such as a clockwork spring or the like, configured to generate restoring force may be included in the support coupling part 121.

Furthermore, a control unit (not shown) configured to control the operation of the plate panel 110 or image code reader 140 may be included in the connection bar 120.

In this case, the control unit (not shown) may receive a control instruction based on the operation of a user, may control the operation of each of the components of the combined reading apparatus 10 based on the control instruction, and may process information read via the plate panel 110 or image code reader 140.

For example, the control unit (not shown) may enable the identification information of a product, read via the plate panel 110 or image code reader 140, to be stored in the combined reading apparatus 10 or user terminal (not shown), and may compare the read identification information of the product with previously stored identification information so as to determine whether the read identification information is new identification information.

In this case, the control unit (not shown) may filter the identification information of the product based on a condition set by a user, and then may store the identification information.

Furthermore, the control unit (not shown) may recognize the strength of a signal received by the plate panel 110 from an RFID tag. The control unit (not shown) may control the plate panel 110 to be rotated based on the strength of the signal, or may selectively operate first and second antennas mounted in the plate panel 110 and configured to have different radio wave characteristics.

An image reader detection unit (not shown) configured to detect the rotation of the image code reader 140 coupled to the mounting part 113 of the plate panel 110 may be included in the connection bar 120.

In this case, the image reader detection unit (not shown) may be connected to the control unit (not shown), and an image reading unit 141 may provide a signal requesting initialization to the control unit (not shown) when the rotation of the image code reader 140 is detected.

In one embodiment, a panel rotation unit (not shown) coupled to one side of the plate panel 110 and configured to rotate the plate panel 110 around the direction in which the connection bar 120 extends may be further included in the connection bar 120.

In this case, a drive motor may be further included in the panel rotation unit (not shown) in order to rotate the plate panel 110, and may be operated in response to a signal applied by the control unit (not shown) and may rotate the plate panel 110.

Meanwhile, the grip 130 of the combined reading apparatus 10 may be formed in a bar shape having a predetermined length so as to be held by a hand, may be spaced apart from the plate panel 110 by a predetermined distance, and may be coupled to the connection bar 120.

A battery configured to provide power to the combined reading apparatus 10 may be formed in a shape similar to that of the grip 130 and mounted in the grip 130, or at least one standard battery may be mounted in the grip 130.

A grip surface 132 configured to come in tight contact with a palm may be included in the grip 130, and may have an anti-slip function.

Furthermore, when the grip 130 is held, fingers may be inserted into a predetermined space formed by the connection bar 120 between the plate panel 110 and the grip 130, thereby maintaining a stable holding state. The grip 130 may be formed to have a thickness "t" sufficient to continuously maintain holding force when the grip 130 is held by a hand.

In this case, in one embodiment, the thickness of the grip 130 may be determined based on that of the grip of a pistol which is classified as a firearm. As the grip 130 has a thickness similar to that of the grip of a pistol, sufficient holding force may be maintained.

A trigger 131 configured to operate the combined reading apparatus 10 may be included in the grip 130, and a power button 133 configured to apply power to the combined reading apparatus 10 may be included in the grip 130.

Meanwhile, the image code reader 140 of the combined reading apparatus 10 according to the embodiment of the present invention may have a shape identical to that of the mounting part 113 included in the plate panel 110, and may be formed to have a thickness identical or similar to that of the plate panel 110.

The image reading unit 141 configured to optically read an image code may be provided in the front of the image code reader 140.

The image code reader 140 may be coupled to a reader coupling shaft 114 provided in the mounting part 113 in the height direction, and may be rotated in the mounting part 113.

The image reading unit 141 located inside the plate panel 110 may be rotated around the reader coupling shaft 114 by external force applied to the image code reader 140, and thus the image reading unit 141 may be exposed outside the recognition surfaces 111 of the plate panel 110.

Meanwhile, the wrist support 150 of the combined reading apparatus 10 may be coupled to the connection bar 120 at one location, may extend by a predetermined length in the direction in which the connection bar 120 extends, and may be curved by a predetermined angle in the direction, in which the grip 130 extends, at one predetermined location.

The wrist support 150 may include a connection part 151 coupled to the support coupling part 121 of the connection bar 120.

In this case, in one embodiment, the connection part 151 may be fastened in such a manner that a male portion having a cross shape is inserted into the female portion of the support coupling part 121.

Accordingly, the connection part 151 may be rotated in one direction by the movement of the wrist support 150, and the support coupling part 121 may be rotated by the connection part 151 in the same direction. Furthermore, the connection part 151 may be rotated by restoring force generated by the support coupling part 121 in a direction opposite to the one direction, thereby returning the wrist support 150 to its original position.

In this case, a wrist of a user is supported by the force which moves the wrist support 150 to its original position due to the restoring force of the support coupling part 121, thereby reducing a load which is generated in the wrist due to the weight of the combined reading apparatus 10 biased to the plate panel 110 when the combined reading apparatus 10 is held.

A planar support surface 152 configured to come in contact with the body of a user holding the grip 130 may be provided in the wrist support 150, and may be formed to have a predetermined curvature in the direction of the central axis of the wrist support 150.

Furthermore, in one embodiment, a wrist support detection unit (not shown) may be included in the combined reading apparatus 10.

The wrist support detection unit (not shown) may detect the rotation of the wrist support 150, and may provide a signal operating the plate panel 110 to the control unit (not shown) when the rotation of the wrist support 150 is detected.

In other words, the wrist support detection unit (not shown) may operate the combined reading apparatus 10 based on the rotation of the wrist support 150 in order to read an RFID tag or image code in the same manner as the trigger 131 of the grip 130 does.

The use states of a combined reading apparatus 10 according to an embodiment of the present invention will be described below.

Figure 4:
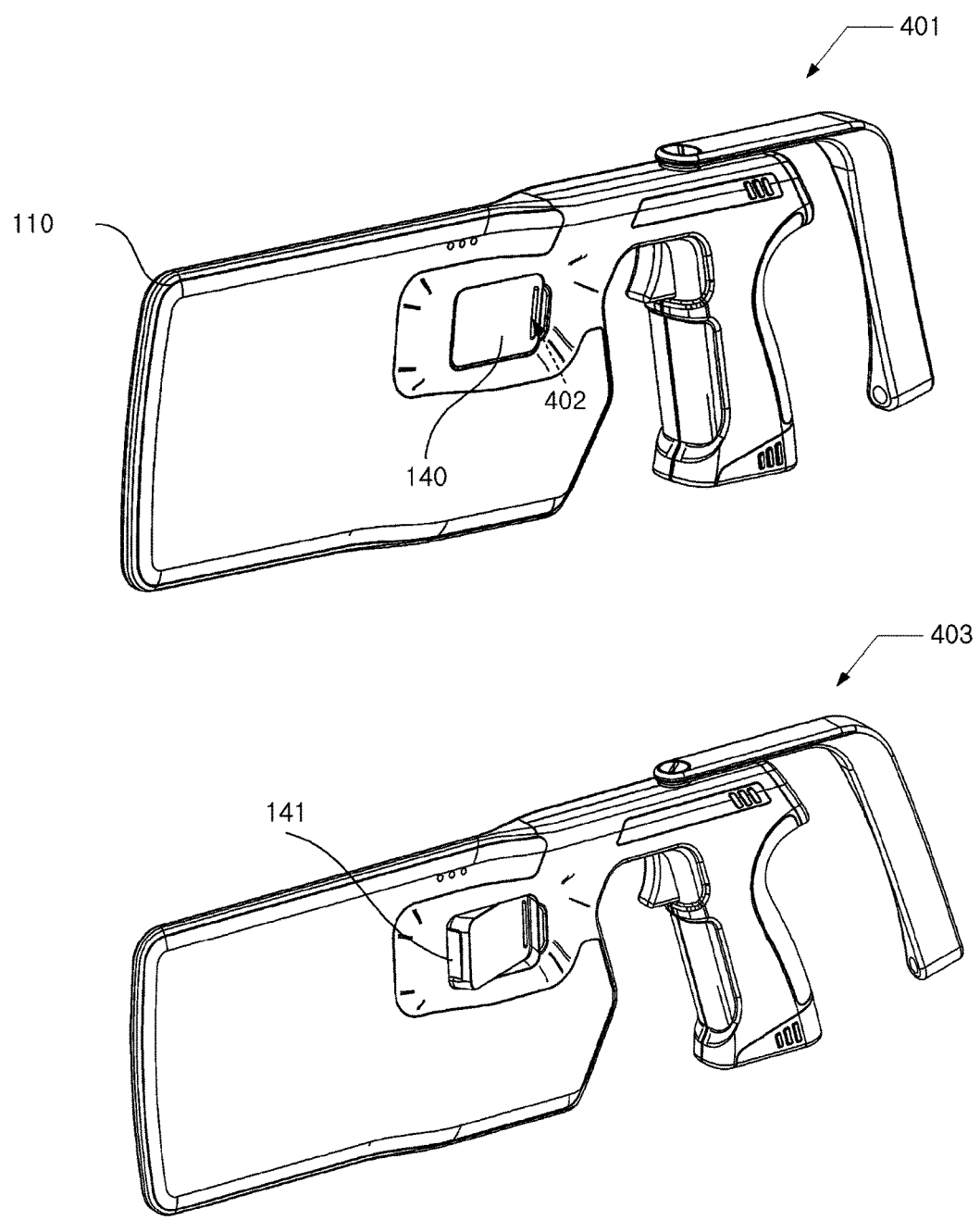
FIGS. 4 and 5 are views showing examples of the use states of a combined reading apparatus according to embodiments of the present invention.

FIG. 4 is a view showing examples of the use states of the image code reader 140 of the combined reading apparatus 10 according to the embodiment of the present invention.

Referring to FIG. 4, in a first state 401, an image code reader 140 disposed in a region of the plate panel 110 of the combined reading apparatus 10 and configured to jointly form a single plate along with the plate panel 110 may be rotated in a direction around the height direction of the plate panel 110 by external force 402 applied to one side of the image code reader 140.

In a second state 403, when the image code reader 140 has been rotated by the external force 402, an image reading unit 141 included in the image code reader 140 may be exposed outside the recognition surfaces 111 of the plate panel 110.

When the image reading unit 141 is operated by the input of a user, the combined reading apparatus 10 may read an image code via the image reading unit 141.

In one embodiment, the combined reading apparatus 10 may detect the rotation of the image code reader 140, and may deactivate an antenna (not shown) mounted in the plate panel 110 when the image code reader 140 has been rotated.

Furthermore, when the combined reading apparatus 10 receives an operation instruction from a user via the trigger 131 of a grip 130, the image reading unit 141 may be operated, and then an image code may be optically read.

Thereafter, when the image code reader 140 has been rotated and aligned in the horizontal direction of the plate panel 110 so as to foam a single plate, the combined reading apparatus 10 may activate the antenna (not shown) previously deactivated and mounted in the plate panel 110.

In another embodiment, when a combined reading apparatus 10 detects the rotation of the image code reader 140, the image reading unit 141 may be also activated along with the antenna (not shown) mounted in the plate panel 110.

Figure 5:
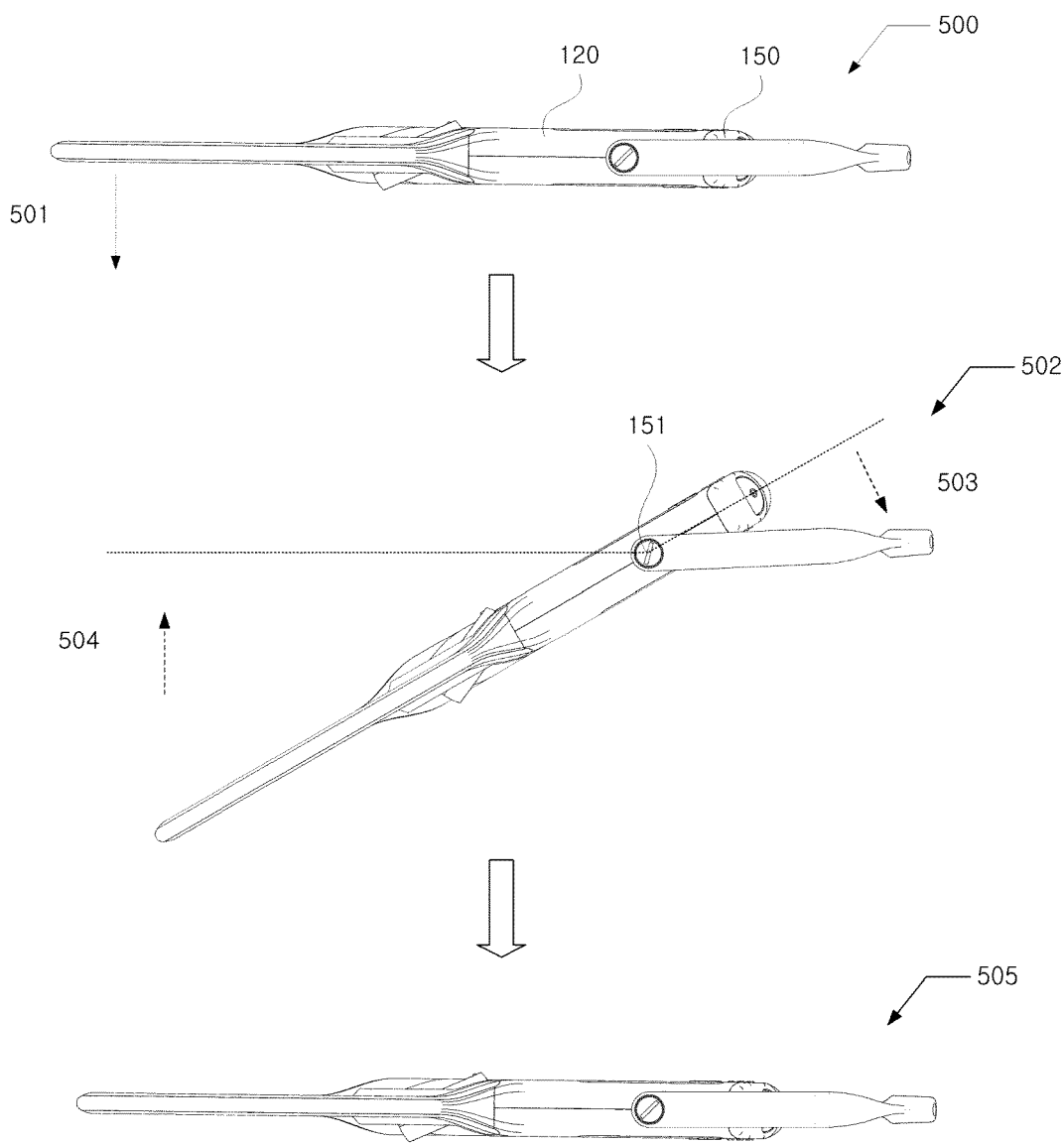

Meanwhile, FIG. 5 is a view showing examples of the use states of the wrist support 150 of a combined reading apparatus 10 according to an embodiment of the present invention.

Referring to FIG. 5, in a first state 500, the wrist support 150 of the combined reading apparatus 10 may be aligned by a support coupling part 121 in the direction in which a connection bar 120 extends, and the support surface 152 of the wrist support 150 may come in contact with a wrist of a user when the user holds a grip 130.

When the user lifts the combined reading apparatus 10, the combined reading apparatus 10 may be inclined in the direction of the gravity 501 due to the weight of the plate panel 110 of the combined reading apparatus 10.

In a second state 502, the wrist support 150 of the combined reading apparatus 10 may be fastened by the wrist of the user, and thus the wrist support 150 may be rotated around a connection part 151.

As restoring force 503 is generated by an elastic member included in the support coupling part 121 coupled to the connection part 151, the combined reading apparatus 10 may undergo movement 504 to its original position, and may be aligned with the wrist support 150 along the same line.

In a third state 505, the wrist support 150 of the combined reading apparatus 10 may be moved to its original position as in the first state 500.

In this case, in one embodiment, the combined reading apparatus 10 may detect the rotation of the wrist support 150, may recognize the rotation of the wrist support 150 as an operation instruction to operate the plate panel 110 or image code reader 140, and may read an RFID tag or image code.

This enables a user to operate the combined reading apparatus 10 simply by holding the combined reading apparatus without a separate input operation, thereby improving convenience.

Meanwhile, in one embodiment, a combined reading apparatus 10 may adaptively rotate a plate panel 110.

To read an RFID tag, the combined reading apparatus 10 may transmit an RF signal via an antenna (not shown) mounted in the plate panel 110, may receive a response signal from the RFID tag, and may detect the strength of the response signal.

Furthermore, the combined reading apparatus 10 may rotate the plate panel 110 around the horizontal direction based on the strength of the response signal.

For example, the combined reading apparatus 10 may detect the strength of the response signal when the plate panel 110 is disposed in a position, and may rotate the plate panel 110 in one direction at predetermined speed when the strength of the response signal is weak.

Furthermore, the combined reading apparatus 10 may detect the strength of the response signal received while the plate panel 110 is being rotated in a direction, and may stop the rotation of the plate panel 110 in the position in which the strength of the response signal is highest.

Accordingly, when a directional antenna is mounted, the combined reading apparatus 10 may set the direction of the antenna to an optimum direction through the rotation of the plate panel 110, thereby increasing the rate of the recognition of RFID tags.

Meanwhile, in a combined reading apparatus 10 according to one embodiment of the present invention, the length of a plate panel 110 may vary.

The plate panel 110 of the combined reading apparatus 10 may include: an antenna panel (not shown), i.e., a plate in which an antenna configured to transmit and receive RF signals to and from an RFID tag is mounted; and a housing (not shown) configured to cover the outsides of the antenna panel (not shown), and coupled to the antenna panel (not shown) so that the antenna panel (not shown) is selectively inserted and discharged through an insertion hole (not shown) open forward in a longitudinal direction.

The antenna panel (not shown) may be inserted through the insertion hole, i.e., a through hole foamed in the front thickness surface 112*a* of the housing (not shown) of the plate panel 110, and the inserted antenna panel (not shown) may be exposed.

In this case, in one embodiment, an elastic object may be included in the housing (not shown) of a plate panel 110 so that an inserted antenna panel (not shown) may be exposed, and a lock (not shown) may be included in the housing (not shown) so that the antenna panel (not shown) inserted into the plate panel 110 may be fastened.

In another embodiment, an electronic drive device (not shown) configured to move the location of an antenna panel (not shown) may be included in the housing (not shown) of a plate panel 110.

Furthermore, an extension button (not shown) configured to control the exposure of the antenna panel (not shown) may be included in a combined reading apparatus 10. Alternatively, a control unit (not shown) may control the exposure of the antenna panel (not shown).

For example, a lock operation button (not shown) configured to operate a lock (not shown) adapted to enable the antenna panel (not shown) to be exposed from the housing (not shown) of the plate panel 110 may be included in the combined reading apparatus 10, and the antenna panel (not shown) may be exposed forward via an elastic object, included in the housing (not shown) of the plate panel 110, when the antenna panel (not shown) is released via the lock operation button (not shown).

Alternatively, for example, the control unit (not shown) may perform control based on the strength of a response signal of an RFID tag so that the antenna panel (not shown) is exposed when the strength of the response signal is weak.

Meanwhile, in a combined reading apparatus 10 according to one embodiment of the present invention, one or more antennas having different radio wave characteristics may be mounted in a plate panel 110.

The combined reading apparatus 10 may selectively operate the antennas mounted in the plate panel 110 based on the strength of a signal received from an RFID tag.

For example, the combined reading apparatus 10 may include a first antenna configured to transmit an RF signal in a vertical direction and a second antenna configured to transmit an RF signal in a horizontal direction, may select one of the first and second antennas having optimum signal sensitivity based on the strengths of signals received from an RFID tag through the operation of the antennas, and may operate the selected antenna.

According to at least any one of the above-described embodiments, there may be provided the combined reading apparatus configured to include the image code reader in order to recognize an image code in addition to an RFID tag while maintaining the size or weight of the RFID reader.

According to at least any one of the above-described embodiments, there may be provided the wrist support configured to support a wrist so that a load, applied to the wrist due to a biased weight attributable to the shape of a combined reading apparatus, can be distributed, thereby preventing a user from being injured.

According to at least any one of the above-described embodiments, the direction of the plate panel configured to recognize an RFID tag may be rotated based on a signal received from an RFID tag, thereby increasing the rate of recognition.

According to at least any one of the above-described embodiments, the antenna of the plate panel configured to recognize an RFID tag can be extended, and thus the range within which an RF signal arrives can be extended, thereby adaptively extending the range within which an object can be recognized.

According to at least any one of the above-described embodiments, the panel configured such that an antenna adapted to read an RFID tag is mounted therein may be formed in a plate shape, and thus the combined reading apparatus can be inserted between products, thereby increasing the rate of the recognition of the products.

According to at least any one of the above-described embodiments, the combined reading apparatus can be inserted between products via the plate-shaped panel, and can lift the product. Accordingly, the products may be easily checked and identified.

Effects of the present invention are not limited to the above-described effects, and other unmentioned effects will be clearly understood from the above-described descriptions by those having ordinary knowledge in the art to which the present invention pertains.

It will be appreciated by those having ordinary knowledge in the art to which the present invention pertains that the present invention may be practiced in other specific forms without changing the technical spirit and essential features of the present invention. Therefore, it should be understood that the above-described embodiments are illustrative but not restrictive in any way. For example, each component described in a single form may be implemented in a distributed form, and, in the same manner, components described in the distributed form may be implemented in a combined form.

The scope of the present invention is defined by the scope of the following claims rather than the specification. It should be appreciated that all modifications or variations derived from the meanings and scope of the claims and equivalents to the claims fall within the scope of the present invention.

What is claimed is:

1. A combined reading apparatus for identifying a product, the combined reading apparatus comprising:
    a plate panel configured to recognize Radio Frequency Identification (RFID) tag information, configured such that an antenna adapted to transmit and receive a Radio Frequency (RF) signal to and from an RFID tag is included therein, and formed in a plate shape having predetermined lengths in a horizontal direction, which is a direction from a front thereof to a rear thereof, and a height direction, which is a direction from a top thereof to a bottom thereof;
    a connection bar coupled to one side of the plate panel, configured to support the plate panel, and configured to extend from the plate panel in the horizontal direction of the plate panel by a predetermined length;
    a grip formed in a bar shape having a predetermined length so as to be held by a hand, spaced apart from the plate panel by a predetermined distance, and coupled to the connection bar;
    a control unit configured to control the RF transmission and reception of the antenna; and
    an image code reader disposed on one side of the plate panel, and configured to read an optically recognizable image code, wherein:
    the plate panel comprises a mounting part configured to penetrate the plate panel from one surface of the plate panel to a remaining surface of the plate panel, configured to have a predetermined size, and configured to accommodate the image code reader; and
    the image code reader is formed in a shape corresponding to that of the mounting part, comprises an image reading unit configured to read the image code and disposed at one of opposite ends of the image code reader disposed on a front side in the horizontal direction, and is rotated within a predetermined angle range around the height direction so that the image reading unit is selectively exposed to the front side.

2. The combined reading apparatus of claim 1, further comprising an image reader detection unit configured to detect whether the image code reader has been rotated and the image reading unit has been exposed from a plane of the plate panel.

3. The combined reading apparatus of claim 2, wherein the control unit controls operation of the image code reader based on a result of the detection of the image reader detection unit, and stops operation of the antenna of the plate panel.

4. The combined reading apparatus of claim 1, further comprising a wrist support configured such that one end thereof is coupled to the connection bar at one location, configured to extend by a predetermined length in a direction in which the connection bar extends, and configured such that a remaining end thereof is curved by a predetermined angle in a direction in which the grip extends.

5. The combined reading apparatus of claim 4, wherein:
    the connection bar comprises a support coupling part configured such that the wrist support is coupled thereto and rotated around the height direction, and configured to apply restoring force to the wrist support so that the wrist support is aligned in a direction in which the connection bar extends; and
    the wrist support comprises a connection part coupled to the support coupling part.

6. The combined reading apparatus of claim 5, further comprising a wrist support detection unit configured to detect rotation of the wrist support, and configured to provide an instruction to operate the plate panel to the control unit when the rotation of the wrist support is detected.

7. The combined reading apparatus of claim 4, wherein the wrist support comprises a support surface configured to come in contact with a body of a user holding the grip and formed to have a predetermined curvature.

8. The combined reading apparatus of claim 1, wherein the connection bar comprises a panel rotation unit coupled to one side of the plate panel, and configured to rotate the plate panel around the horizontal direction.

9. The combined reading apparatus of claim 8, wherein the control unit measures strength of the signal of the RFID tag received via the plate panel, and controls the rotation of the plate panel based on the measured strength of the signal of the RFID tag.

10. The combined reading apparatus of claim 1, wherein the plate panel comprises an antenna panel configured such that the antenna is mounted therein, and a housing configured to cover outsides of the antenna panel and coupled to the antenna panel so that the antenna panel is selectively inserted and discharged through an insertion hole open forward in the horizontal direction.

11. The combined reading apparatus of claim 1, wherein:
the antenna comprises first and second antennas configured to transmit radio waves having different characteristics; and
the control unit selectively operates the first and second antennas by operating at least one of the first and second antennas based on strength of the signal received from the RFID tag.

\* \* \* \* \*